United States Patent [19]
Furman

[11] Patent Number: 5,898,769
[45] Date of Patent: Apr. 27, 1999

[54] CALL ROUTING BASED ON PRIOR TELEPHONE CALLS

[75] Inventor: Daniel Selig Furman, Summit, N.J.

[73] Assignee: AT&T Corp, Middletown, N.J.

[21] Appl. No.: 08/816,443

[22] Filed: Mar. 12, 1997

[51] Int. Cl.⁶ .................................................. H04M 7/00
[52] U.S. Cl. ........................ 379/221; 379/229; 379/207
[58] Field of Search ..................................... 379/219, 220, 379/221, 229, 230, 201, 207, 210, 211

[56] References Cited

U.S. PATENT DOCUMENTS

| | | | |
|---|---|---|---|
| 5,625,681 | 4/1997 | Butler, II | 379/220 X |
| 5,717,749 | 2/1998 | Sneed, Jr. et al. | 379/207 |
| 5,729,599 | 3/1998 | Plomondon et al. | 379/211 |
| 5,757,900 | 5/1998 | Nagel et al. | 379/219 X |
| 5,764,745 | 6/1998 | Chan et al. | 379/220 X |
| 5,793,857 | 8/1998 | Barnes et al. | 379/220 X |
| 5,805,688 | 9/1998 | Gillespie et al. | 379/207 X |

*Primary Examiner*—Creighton Smith
*Attorney, Agent, or Firm*—Robert B. Levy

[57] ABSTRACT

A call through a telecommunications network (10) that is dialed by a caller (12) to a lifetime number of a subscriber (14) that may be in common with the lifetime number of at least one other subscriber is routed in accordance with the past call history of one of the calling party and the subscribers with lifetime numbers common to the dialed number. The call from the caller is routed to that lifetime number subscriber to whom the caller has previously called on the basis that the caller is more likely to want a connection with someone who the caller had previously called.

18 Claims, 1 Drawing Sheet

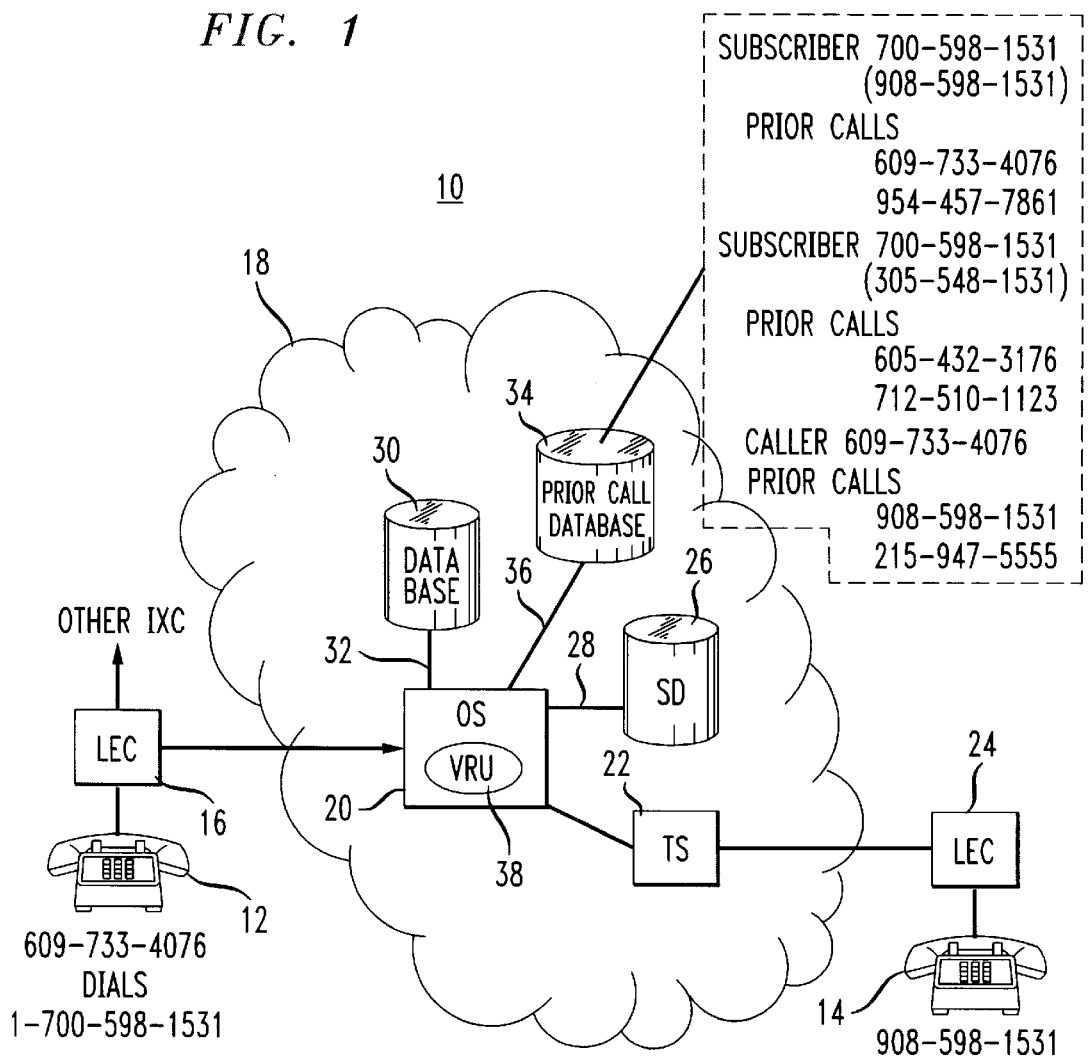

CALL ROUTING BASED ON PRIOR TELEPHONE CALLS

TECHNICAL FIELD

This invention relates to a technique for routing a call through a telecommunications network based on past calls between calling and called parties.

BACKGROUND ART

Within most of North America, telephone subscribers possess ten-digit telephone numbers of the form AAA-XXX-YYYY. The first three digits (AAA) represent an area code, designating the region in which the subscriber resides. The second three digits (XXX) represent an exchange, i.e., the local central office serving the subscriber. Finally, the last four digits (YYYY) represent a line number associated with the subscriber. For out-of-area code calls, the calling party dials the called party's ten-digit number. The calling party's call is received at the caller's Local Exchange Carrier (LEC) that, in turn, routes the call to an Inter-Exchange Carrier, such as AT&T. The IXC in turn, routes the call to the called party's LEC. A local call within the same exchange, or to a nearby exchange in the same Local Access and Transport Area (LATA), may not require dialing of the full ten-digits. Rather, for such calls, a caller simply dials the last seven digits of the called party's ten-digit number, hereinafter referred to as a "POTS" number. The manner in which ten-digit and seven digit calls are routed is well known.

Today, a person's telephone POTS number is often that person's most ubiquitous identifier. For that reason, individuals that move want to retain their prior seven-digit POTS number because others often identify them by their previous phone number. The ideal solution would be for subscribers to retain their originally assigned seven-digit POTS number for life, regardless of their present residence and the exchange providing service to that residence. However, this approach would require a data base inquiry for each call to perform any necessary translation for POTS numbers that might not correspond to a particular geographical area.

A present day solution to the problem of providing subscribers with lifetime numbers is to designate a Service Access Code (SAC), such as 500 or 700, to accommodate such numbers. Unfortunately, the lifetime numbers assigned to subscribers usually have no relationship to their present or past seven-digit POTS numbers. If subscribers were assigned lifetime numbers corresponding to their seven-digit POTS numbers, then conflicts would arise between subscribers in different areas having the same seven-digit POTS numbers. The inability of a subscriber to receive a lifetime number that corresponds to that subscriber's seven-digit POTS number has been an impediment to widespread adoption of this service.

One possible solution to this problem would be to assign different SACs to subscribers having the same seven-digit POTS number. Thus, for example two subscribers having the same seven-digit POTS number XXX-YYYY might be assigned a SAC of 400 and 500 respectively, to differentiate between them. The use of multiple SACs avoids ambiguity but destroys the correspondence relating a POTS number to a single lifetime number.

Thus, there is a need for a technique for routing calls to lifetime numbers that comprise a single SAC and the subscriber's seven-digit POTS number while avoiding a conflict between in routing calls to different subscribers having the same lifetime number (i.e., the same SAC and seven-digit POTS number).

BRIEF SUMMARY OF THE INVENTION

Briefly, in accordance with a preferred embodiment of the invention, a method is provided for routing a call in a telecommunications network that is dialed by a caller to a lifetime number of a subscriber that may be in common with the lifetime number of at least one other subscriber. To route such a call without conflict, the network first determines whether the dialed lifetime number is unique to a single subscriber. If so, then no ambiguity exists and the network routes the call to the dialed lifetime number. (If necessary, the network might have to translate the lifetime number to an ordinary telephone of the called party to complete the call.) Should the dialed lifetime number be common to two or more subscribers, then the network examines the prior call history associated with at least one of the calling party and each of the subscribers with lifetime numbers in common with the dialed number. From the prior call history, the network determines whether there have been any previous calls between the calling party and each of the subscribers with the lifetime numbers in common with the dialed number. If there has been a past call, then the present call is routed to the subscriber that was a party to a past call on the assumption that is its more likely the calling party wishes to communicate with someone with whom the calling party has previously communicated.

In accordance with another aspect of the invention, the identity of the lifetime number subscriber to whom the call will be routed is announced to the calling party prior to call completion. In this way, the calling party is given an opportunity to accept the anticipated routing, or to decline, whereupon the calling party receives a subsequent announcement designating the next party to whom the call will be routed. This process is repeated until the call from calling party is routed to the desired lifetime number subscriber.

In the case where there is ambiguity because of no match, or no unique match can be made, the caller can be prompted to speak the name of the called party. The name spoken by the calling party is then compared to the stored names of the lifetime number subscribers with the called POTS number. This technique could be used if the caller indicates the initial selection is incorrect. Other variations are possible. For example, the caller could be prompted to use the touch tone key pad to spell the name of the person being called.

BRIEF DESCRIPTION OF THE DRAWING

FIG. 1 depicts a telecommunications network for routing calls in accordance with the invention.

DETAILED DESCRIPTION

FIG. 1 depicts a telecommunications network 10 for routing a call from a first subscriber 12 to a second subscriber 14. In the exemplary embodiment, the subscriber 12 has a telephone number 609-733-4076, the last seven digits (733-4076) of which represent the subscriber's Plain Old Telephone Service (POTS) number. The subscriber 14 has a telephone number (908) 598 1531 whose last seven digits (598-1531) represent that subscriber's POTS number. (It should be understood that the subscribers 12 and 14 may have different POTS numbers, depending on their geographic location, and serving exchange.)

Presently, a call from the subscriber 12 directed to the subscriber 14 passes initially to a Local Exchange Carrier 16 (LEC) that serves the subscriber 12. Upon receipt of the call from the subscriber 12, the LEC 16 determines the destination of the call based on the dialed number. When the called party (i.e., subscriber 14) lies outside the LATA served by the LEC 16, the LEC routes the call to an Inter-Exchange Carrier (IXC) 18, such as AT&T. Within the IXC network 18, an Originating Toll Switch (OS) 20 receives the call from the LEC 16 and then routes the call to a Terminating Toll Switch (TS) 22. The TS 22 routes the call to a LEC 24 serving the subscriber 14 called by the subscriber 12. (Note that the OS 20 could serve both the LECS 16 and 24. Alternatively, one or more via Toll Switches (not shown) may lie between the OS 20 and TS 22.)

The routing of the call from the LEC 16 to the IXC 18, as opposed to another IXC, is determined by the preference of the calling party (i.e., subscriber 12). Generally, subscribers preselect their IXC. Thus, in the absence of a specific request to the contrary, a call received by the LEC 16 from the subscriber 12 is routed to that subscriber's preselected IXC (i.e., IXC 18). On a call-by-call basis, the subscriber 12 can select another IXC by prepending that IXC's Carrier Identification Code (CIC) to the dialed number. For example, AT&T has a CIC code 10288 so that a caller seeking AT&T as its IXC for a particular call need only prepend the CIC 10288 prior to dialing the called number.

In accordance with the invention, the subscriber 14 also possess a universal or lifetime telephone number comprised of a three-digit Service Access Code (e.g., 700) and the subscriber's seven-digit POTS number (598-1531). Thus, the subscriber 12 can call the subscriber 14 by dialing either 908-598-1531 or 700-598-1531. Should the subscriber 14 move outside the 908 area code, or move within that area code to a location served by a different exchange, the subscriber 12 may readily contact the subscriber 14 by dialing the number 700-598-1531.

It may also be possible to assign a subscriber a lifetime number utilizing a four-digit Variable Service Code (VSC) comprised of the subscriber's area code (e.g., 908) prepended by a non-digit character, such as "*" or "#". In accordance with the embodiment of FIG. 1, the subscriber 14 could be assigned a lifetime number of *908-598-1531, rather than 700-598-1531. Thus, the term "lifetime number", as used herein contemplates either a SAC or VSC prepended to the subscribers seven-digit POTS number.

In the past, the carrier (i.e., an IXC) providing lifetime number service assigned lifetime numbers to subscribers that generally did not correspond to the subscriber's seven-digit POTS number (past or present). Different lifetime numbers were assigned to avoid the difficulty in routing a call to a lifetime number common to two or more subscribers. In the illustrated embodiment, the subscriber 14 possesses the seven-digit POTS number 598 1531, while another subscriber in the residing in the 305 area code may also possess the same seven-digit POTS number (598-1531). Ordinarily, calls directed to (908) 598-1531 are distinguished from those directed to (305) 598-1531 because the area codes are different. However, assume that the subscriber with the ten-digit number (305) 598-1531 wants a lifetime number corresponding to that subscriber's seven-digit POTS number, the same POTS number as subscriber 14. Under such circumstances, at least two different subscribers would have the same lifetime number.

The difficulty in routing calls to subscribers having common lifetime numbers is overcome, in accordance with the invention, by making reference to the prior call history of one of the calling party (i.e., subscriber 12) and each of the subscribers (including the subscriber 14) who have lifetime numbers common to the dialed number. The manner in which the prior call history is utilized to overcome the ambiguity in routing calls may best be understood as follows. When the subscriber 12 dials the lifetime number (1-700-598-1531 or *908-598-1531) associated with the subscriber 14, the call passes from the subscriber to the LEC 16. The LEC 16, in turn, routes the call to the IXC, (i.e., IXC 18) providing the lifetime number service associated with the SAC in connection with the dialed lifetime number. The OS 20 within the IXC 18 receives the lifetime number call and then communicates with a directory 26, referred to as a Segmentation Directory (SD) that is linked to the OS 20, via a signaling link 28, such as a signaling link within AT&T's CCSS7 signaling network.

The SD 26 contains information regarding how different types of calls should be processed by the OS 20. Typically, for lifetime number calls, the SD 26 directs the OS 20 to consult a Data Base 30. The Data base 30 is connected to the OS 20 by a signaling link 32 and contains the lifetime numbers and the subscribers to whom such numbers are assigned. Upon consulting the data base 30, the OS 20 determines whether the lifetime number dialed by the subscriber 12 corresponds to a unique subscriber, or whether the dialed lifetime number is common to several subscribers. If the dialed lifetime number is unique to a single subscriber, say subscriber 14, then there is no ambiguity and the OS 20 routes the call to the TS 22 associated with the LEC 24 that serves the subscriber 14. In routing the lifetime number call, the OS 20 may have to translate the call into the called party's ordinary ten-digit number, especially if the number does not possess the same seven-digit POTS number. Such translation information is obtained from the DB 30.

However, now consider the possibility that the lifetime number dialed by the subscriber 12 number corresponds to two or more subscribers, as indicated from the information contained in the DB 30. Pursuant to the invention, the OS 20, upon determining there are multiple subscribers having a lifetime number in common with the dialed number, now consults a Data Base (DB) 34 coupled to the OS 20 via a link 36. The DB 34 contains a listing of calls previously made over a prescribed interval, say several months, by subscribers having lifetime numbers furnished in connection with the lifetime number service maintained by the IXC 18. The purpose in examining the prior call history is to determine if any of the subscribers having the same lifetime number dialed by the calling party (i.e., subscriber 12) have previously called that party in the past. If one of several subscribers having the lifetime number dialed by the calling party has previously called that party, then the calling party is presumed to want a connection with the lifetime subscriber that had previously called.

As depicted in FIG. 1, assume the subscriber 14 possesses the lifetime number 700-598-1531 in common with a lifetime number subscriber whose ordinary ten-digit number is 305-598-1531. Upon examination of the prior call history of these two lifetime number subscribers recorded in the DB 34, the OS 20 determines that the subscriber 14 (having the ten-digit number 908-598-1531) has previously called the number 609-733-4076 associated with the subscriber 12 placing the call. Therefore, the probability is high that the subscriber 12 intended to call the subscriber 14 because of at least one past call between them. Hence, the call is routed by the OS 20 to the TS 22 serving the LEC 24 that serves the subscriber 14 to whom the call is intended (as determined from the prior call history).

To avoid ambiguity, the switch 20 could provide an announcement, via a Voice Response Unit (VRU) 38, reporting to the calling party (i.e., subscriber 12) the identity of the subscriber (i.e., the subscriber 14) to whom the call will be routed. In this regard, the calling party would have the option of canceling the call if the anticipated routing is incorrect. Thereafter, the OS 20 would announce the identity of the next subscriber having the same lifetime number as dialed, thus allowing the calling party to confirm or reject the new anticipated routing. This process would continue until the call was canceled or until the call is ultimately routed to the lifetime number subscriber selected by the calling party.

In the case where there is ambiguity because of no match or no unique match can be made, the OS 24 could prompt the caller (subscriber 12) to speak the name of the called party (subscriber 14). The OS 24 would then compare the spoken name to the stored names of the lifetime number subscribers with the called POTS number via a voice recognition unit (not shown). If the spoken name corresponded with one of the stored names, then the call would be routed to the matching stored name. This technique could be used if the caller indicated the initial selection is incorrect. Other variations are possible. For example, the caller could be prompted to use the touch tone key pad to spell the name of the person being called rather than speak the name.

The concept of employing the prior call history to route calls to subscribers having lifetime numbers in common with the dialed number could be extended to examining the prior call history of the calling party as well, assuming the calling party's prior call history is available. If the calling party (i.e., subscriber 12) selected the IXC 18 for interexchange calls, then that IXC typically will typically possess a record of past calls made by the calling party. Thus, if the calling party has previously dialed the ten-digit number of the subscriber 14 and now dials that same subscribers lifetime number, the past calling history of the calling party could be used to resolve routing ambiguities.

Using the prior calling history and/or announcing the identity of the called party could be employed to facilitate the adoption of personal lifetime numbers, whereby two or more individuals having the same ten digit number (e.g., 908-598-1531), and hence, the same universal number (e.g., 500-598-1531) could be differentiated. For example, consider two individuals, Mr. and Mrs. John Doe, living at the same residence with the same POTS number and hence, the same lifetime number. The prior call history could be utilized to differentiate between these individuals, provided separate record of the calls made by each party were kept. To facilitate such separate records, each individual would have to differentiate his or her calls, possibly by appending one or more digits specifically identifying that individual each time that individual placed a call.

Rather than use the prior call history, the OS 20 would successively announce the identity of each of the individuals having the same personal lifetime number dialed by the calling party (i.e., subscriber 12). Thus, if a calling party wanted to speak to Mrs. John Doe, who lives with her husband Mr. John Doe at same residence, and who both have the same personal lifetime number, the OS 20, via its VRU 38, would announce to the calling party that its was calling Mrs. John Doe. The calling party (i.e., subscriber 12) would signal the OS 20, typically by entering a particular DTMF signal, or by speaking a particular phase, whether the anticipated call routing was correct (i.e., whether the call should be routed to Mrs. John Doe). Depending on the response, the OS 20 would either route the call to the announced party, or select another subscriber to whom the call should be routed. To differentiate different callers at the same residence, the LEC 24 would supply different rings, each unique to a separate individual. Ultimately, if no further subscribers can be selected, then call routing is terminated.

The foregoing describes a technique for routing calls to dialed by a subscriber (12) to a lifetime number that may be common to two or more subscribers, wherein prior call history and/or announcement of the called party's identity, are utilized to avoid ambiguity.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for routing a call through a telecommunications network that is dialed by a caller to a lifetime number of a subscriber that may be in common with the lifetime number of at least one other subscriber, comprising the steps of:

determining, within the telecommunications network, whether the lifetime number dialed by the subscriber is unique to a single subscriber, and if so, then routing the call to that subscriber, but if not, then;

determining whether the dialed lifetime number is common to a plurality of subscribers, and if so, then examining a history of prior calls of one of the called party and each subscribers having a lifetime number in common with the dialed lifetime number to determine whether there have been at least one past call between said each subscriber and the called party, and if so, then routing the call to said each party.

2. The method according to claim 1 wherein only the prior call history of each lifetime number subscriber having a lifetime number in common with the dialed number is examined.

3. The method according to claim 1 wherein the prior call history of both the called party and each of the lifetime number subscribers having a lifetime number in common with the dialed number is examined.

4. The method according to claim 1 further including the steps of:

providing an announcement to the calling party indicating to whom the call will be routed; and prompting the calling party to provide an indication of whether such routing is correct prior to actually routing the call.

5. The method according to claim 4 further including the step canceling the routing if the calling party has provided an indication that the routing is incorrect.

6. The method according to claim 1 wherein the subscribers with common lifetime numbers have common POTS numbers but different area codes.

7. The method according to claim 1 wherein the subscribers with common lifetime numbers have common POTS numbers and common area codes.

8. A method for routing a call through a telecommunications network that is dialed by a caller to a lifetime number of a subscriber that may be in common with the lifetime number of at least one other subscriber, comprising the steps of:

(a) determining, within the telecommunications network, whether the lifetime number dialed by the subscriber is unique to a single subscriber, and if so, then routing the call to that subscriber, but if not, then;

(b) determining whether the dialed lifetime number is common to a plurality of subscribers, and if so, (c) selecting a first one of said lifetime number subscribers having lifetime number in common with the dialed number;

(d) providing an announcement to the calling party identifying said selected subscriber to whom the call will be routed; and (e) prompting the calling party to provide an indication of whether such routing is correct prior to actually routing the call; and (f) routing the call to said selected subscriber when the calling party has indicated the routing in correct.

9. The method according to claim 8 further including the step of:

(g) selecting another of said lifetime number subscribers having lifetime number in common with the dialed number if the calling party has indicated the routing is incorrect; and (h) repeating steps (c)–(g).

10. The method according to claim 9 wherein call routing is canceled when no further lifetime subscribers can be selected.

11. A method for routing a call through a telecommunications network that is dialed by a caller to a lifetime number of a subscriber that may be in common with the lifetime number of at least one other subscriber, comprising the steps of:

(a) selecting a first one of said lifetime number subscribers having lifetime number in common with the dialed number;

(b) providing an announcement to the calling party identifying said selected subscriber to whom the call will be routed; and (c) prompting the calling party to provide an indication of whether such routing is correct prior to actually routing the call; and (d) routing the call to said selected subscriber when the calling party has indicated the routing in correct.

12. The method according to claim 8 further including the step of:

(g) selecting another of said lifetime number subscribers having lifetime number in common with the dialed number if the calling party has indicated the routing is incorrect; and (h) repeating steps (c)–(g).

13. The method according to claim 9 wherein call routing is canceled when no further lifetime subscribers can be selected.

14. The method according to claim 11 wherein the subscribers with common lifetime numbers have common POTS numbers but different area codes.

15. The method according to claim 11 wherein the subscribers with common lifetime numbers have common POTS numbers and common area codes.

16. A method for routing a call through a telecommunications network that is dialed by a caller to a lifetime number of a subscriber that may be in common with the lifetime number of at least one other subscriber, comprising the steps of:

determining, within the telecommunications network, whether the lifetime number dialed by the subscriber is unique to a single subscriber, and if so, then routing the call to that subscriber, but if not, then;

determining whether the dialed lifetime number is common to a plurality of subscribers, and if so, then prompting the calling party to enter a name associated with the called party;

accepting the name entered by the calling party;

comparing the name of the called party entered by the calling party to the names associated with the lifetime numbers common to the dialed number;

routing the call to the called party whose name matches the name entered by the caller.

17. The method according to claim 16 wherein the name entered by the calling party is accepted by accepting the name that is spoken by the calling party.

18. The method according to claim 16 wherein the name entered by the calling party is accepted by accepting digits representing the name that are entered by the calling party.

* * * * *